(12) United States Patent
Biggs et al.

(10) Patent No.: US 9,313,471 B2
(45) Date of Patent: Apr. 12, 2016

(54) PRESENTING BACKUP CONTENT

(75) Inventors: Kent E Biggs, Tomball, TX (US);
Robert Joseph Rosenberry, Houston, TX (US); Michael A Provencher, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 783 days.

(21) Appl. No.: 13/360,155

(22) Filed: Jan. 27, 2012

(65) Prior Publication Data

US 2013/0195420 A1 Aug. 1, 2013

(51) Int. Cl.
*H04N 5/94* (2006.01)
*H04N 9/82* (2006.01)

(52) U.S. Cl.
CPC .................................. *H04N 9/8205* (2013.01)

(58) Field of Classification Search
CPC ....................................................... H04N 9/8205
USPC ............................ 714/4.11; 340/540; 386/263
See application file for complete search history.

(56) References Cited

U.S. PATENT DOCUMENTS

| | | | |
|---|---|---|---|
| 7,616,869 B2 * | 11/2009 | Adachi | 386/248 |
| 2002/0015494 A1 * | 2/2002 | Nagai et al. | 380/201 |
| 2006/0015531 A1 | 1/2006 | Fraind et al. | |
| 2009/0198816 A1 | 8/2009 | Bannister et al. | |
| 2009/0217084 A1 | 8/2009 | Ebbert et al. | |
| 2010/0118200 A1 | 5/2010 | Gelman et al. | |
| 2011/0083157 A1 * | 4/2011 | Addair | 725/120 |
| 2012/0050039 A1 * | 3/2012 | Mutch et al. | 340/540 |
| 2012/0151327 A1 * | 6/2012 | Jin et al. | 715/234 |
| 2013/0238926 A1 * | 9/2013 | Michaelson et al. | 714/4.11 |

OTHER PUBLICATIONS

"Digital Signage Player Uses a USB Drive to Show Images & Videos"; Displays 2Go; 2 pages.
"Innovation & Design"; Fujitsu Dgital Media Solutions; 9 pages.

* cited by examiner

*Primary Examiner* — Thai Tran
*Assistant Examiner* — Mishawn Hunter
(74) *Attorney, Agent, or Firm* — HP Patent Department

(57) ABSTRACT

Techniques that relate to selecting content for playback are disclosed in various implementations. The techniques may include receiving, at a computing device and from a primary electronic content source, a first input signal for playback by a presentation device. The techniques may also include analyzing information that is indicative of content represented by the first input signal to determine whether the first input signal is intended for playback by the presentation device. The techniques may also include causing the presentation device to play back a second input signal from a backup electronic content source in response to determining that the first input signal is not intended for playback by the presentation device.

17 Claims, 3 Drawing Sheets

PRESENTING BACKUP CONTENT

BACKGROUND

Digital signage systems may be used to present information to viewers in a variety of public places, such as shopping malls, retail stores, airports, and other locations. In contrast to traditional printed signs, digital signage may be configured to display dynamic content, which may be updated relatively frequently to provide current and relevant information to viewers. Over the past several years, digital signage has continued to grow in popularity due in part to its inherent flexibility, versatility, and effectiveness in communicating a desired message to viewers.

DETAILED DESCRIPTION

Figure 1:
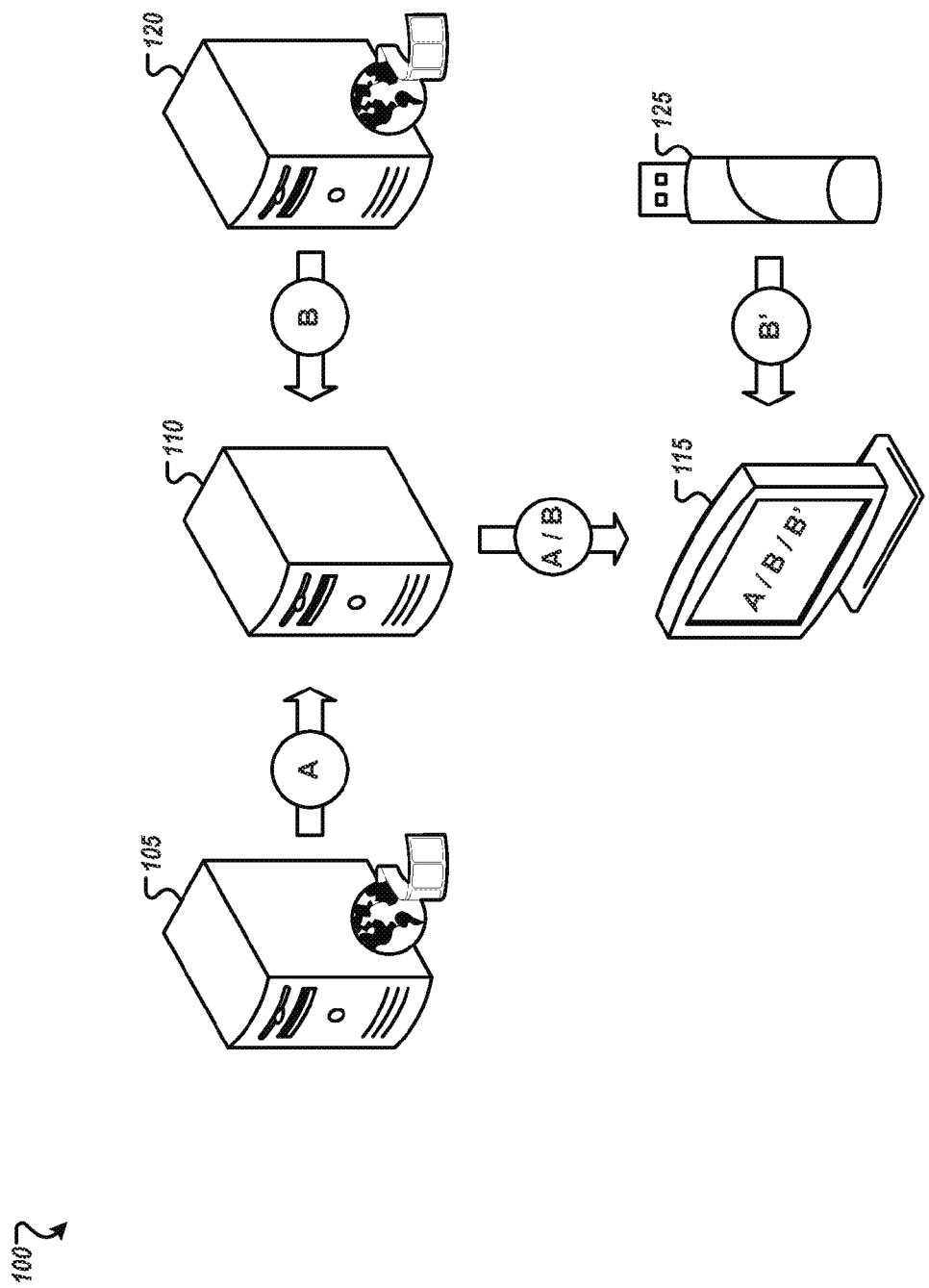
FIG. 1 shows a conceptual diagram of an example digital signage system.

As with other electronic systems that include electronic hardware and/or software, digital signage systems are not immune to failure or malfunction. When one or more components of a digital signage system fails or otherwise malfunctions, the digital sign may display unintended information to viewers rather than displaying the intended content. For example, in the context of a digital sign at a retail location, the intended content may include a continuously playing set of product videos that highlight various features and other product information that may be of interest to shoppers viewing the digital sign. If the content source for the product videos fails, for example due to an operating system error, the digital sign may show the error information instead of the product videos. Depending on the type of failure or malfunction, the digital sign may show various types of unintended information, including, for example, error messages, blue screens, blank screens, frozen screens, reboot and/or startup screens, hijacked screens, or other types of information that are generally of no use to viewers, and that can result in lost revenue to businesses.

Displaying such unintended information may cause any of a number of adverse consequences. For example, in the retail context described above, the retailer may lose potential sales of the products being advertised or lose advertising dollars from product vendors, and may also lose credibility with shoppers. As another example, a malicious individual may use error information that is unintentionally presented on a digital sign to gain insight that may allow the viewer to hack the system, and may also cause the digital sign to display a hijacked screen that displays the malicious individual's content rather than the intended content. While these are both examples of relatively serious consequences, a malfunction that causes the digital sign to display unintended content is, at the very least, an inconvenience to identify and resolve.

According to the techniques described here, a digital signage system may be configured with a primary content source and a backup content source, and may automatically switch to displaying content from the backup content source if the system determines that the primary content source is providing information that is not intended for display to viewers. For example, continuing with the retail context described above, if the system detects an error condition associated with the primary content source signal (e.g., an error message rather than the intended content of product videos), the system may automatically disable the signal coming from the primary content source, and may instead switch to an input signal from the backup content source. As another example, continuing with the malicious hijacking context described above, if the system detects that the primary content has been compromised, the system may automatically switch over to display the backup content.

In some implementations, the backup content source may be "closer" to the display device in the playback chain such that failures in the network or infrastructure associated with the playback chain are less likely to affect the backup content than the primary content. In some implementations, the backup content may be included with a standalone backup content device that may be connected directly to the display device, which may further mitigate against network or infrastructure issues. In other implementations, the backup content may be integrated with the display device itself.

The backup content source may be configured to present any appropriate content while the primary content source is unavailable. For example, the backup content source may provide different types of content such as images, video, or other appropriate files for playback on the digital display device. In some cases, the content may be similar to that of the primary content source, and may even be the same content that would otherwise be provided by the primary content source. In other cases, the content may be as simple as a static logo that represents the brand of the products being advertised by the digital sign. Regardless of the backup content that is provided for display, the digital sign may achieve its intended purpose of displaying useful information (rather than unintended information) to viewers.

The techniques described here may provide a number of advantages. For example, in some implementations, backup content may be displayed (rather than boot screens or failure-related screens) while the primary content source is offline, e.g., while the primary content source is being booted or rebooted. Such backup content may be displayed for any length of time, e.g., until the primary source has completely rebooted or has otherwise come back online. In some implementations, the backup content may be displayed in the event of a network or infrastructure outage that prevents the primary content from reaching the display device. These and other advantages will be apparent from the description that follows.

FIG. 1 shows a conceptual diagram of an example digital signage system 100. The digital signage system 100 includes a primary content source 105, a computing device 110, and a display device 115. The digital signage system 100 may also include either a backup content source 120 or a standalone backup content device 125, or both. For purposes of clarity, the relative locations of the components are not shown, but it should be understood that the components may be distributed across multiple locations, or may be present in a single location, depending on the requirements of the system. For example, primary content source 105 may represent a central content server that provides content, e.g., over a network, to a number of different locations, and as such, may be located in a separate location than computing device 110 and display device 115.

In normal use, primary content source 105, computing device 110, and display device 115 may operate similarly to a traditional digital signage system. For example, primary content source 105 may generate, select, or otherwise identify primary content to be provided for presentation by the display device 115. The primary content is illustrated by the label A. Such content may be transmitted to computing device 110 over any appropriate wired or wireless connection.

Computing device 110 may include a media player that is capable of rendering the received primary content and providing the content to the display device 115. Computing device 110 may also include appropriate software, such as an operating system, display drivers, services, and/or applications, for causing the received content to be displayed on the display device 115. Although computing device 110 is illustrated as a server, computing device 110 may represent other appropriate computing devices, such as a thin client, a personal computer (PC), a workstation, a single purpose media player (e.g., an MPEG player), or other similar devices.

In some implementations, computing device 110 may be connected to display device 115 using either proprietary or industry standard video connectors, such as VGA, DVI, HDMI, DisplayPort, or other appropriate physical connections. In other implementations, computing device 110 may be hosted remotely from display device 115, and may be connected to the display device 115 using a network port and streaming video content, e.g., over Ethernet cabling or over a wireless network. In other implementations, computing device 110 may be integrated with display device 115. For example, although computing device 110 is shown and described above as being separate from display device 115, portions or all of the components and/or functionality described with respect to computing device 110 may be integrated into display device 115.

Digital signage system 100 may also include one or more backup content sources, such as backup content source 120 and/or standalone backup device 125. As shown, backup content source 120 may represent a similar but alternate content source to primary content source 105. As with primary content source 105, backup content source 120 may generate, select, or otherwise identify backup content to be provided for presentation by the display device 115, and may transmit such backup content to computing device 110, e.g., over a network. The backup content from backup content source 120 is illustrated by the label B.

In accordance with the techniques described here, computing device 110 may determine whether to provide the primary content (A) or the backup content (B) for display via the display device 115. For example, if computing device 110 determines that the primary content is intended for display via display device 115, computing device 110 may cause the primary content (A) to be displayed. Otherwise, computing device 110 may cause the backup content (B) to be displayed.

Computing device 110 may use a number of different techniques, either alone or in various combinations, to determine whether the primary content is intended for display by the display device 115. For example, computing device 110 may use failure detection techniques that are based on the display resolution of the primary content, a display mode of the primary content, an application event or a heartbeat signal that is associated with a playback mechanism of the primary content, and/or metadata or a digital watermark associated with the primary content. Any of these failure detection techniques may indicate a potential failure in at least a portion of the playback chain associated with the primary content (A).

In a failure detection mode that is based on the display resolution of the primary content, computing device 110 may analyze the display resolution of the primary content and compare it to an expected display resolution of the content. In this failure detection mode, an expected display resolution may be defined either explicitly or implicitly. For example, a system administrator may explicitly identify one or more expected display resolutions that should be considered as valid display resolutions. As another example, an expected display resolution may be implicitly defined based on the capabilities of the particular display device, such as a maximum or optimal display resolution associated with the device. In either case, if the display resolution of the primary content does not match any of the expected display resolutions, then computing device 110 may cause the backup content, rather than the primary content, to be displayed on display device 115.

In a failure detection mode that is based on a display mode of the primary content, computing device 110 may analyze whether the display mode of the content is equivalent to a known undesirable display mode. For example, when a computing device is being booted or has failed, e.g., showing a blue screen, the primary content may be in a text mode. If computing device 110 determines that the primary content is in such a text mode, or in any other undesirable display mode, then computing device 110 may cause the backup content, rather than the primary content, to be displayed on display device 115.

In a failure detection mode that is based on an application event or a heartbeat signal that is associated with a playback mechanism of the primary content, computing device 110 may monitor for an application event or a heartbeat signal, e.g., associated with an application executing on primary content source 105, computing device 110, or display device 115. When the application is executing normally, the application may periodically issue a heartbeat signal at predetermined time intervals, such as every second. If the heartbeat signal is not received by computing device 110 within an expected period of time, e.g., five seconds (corresponding to five missed heartbeat signals), computing device 110 may assume that the lack of the heartbeat signal is indicative of a failure. For example, the application may no longer be executing normally, or the device on which the application is executing may no longer be in communication with computing device 110. As such, if computing device 110 determines that the heartbeat signal has not been received for a period of time that is longer than expected, the computing device 110 may cause the backup content, rather than the primary content, to be displayed on display device 115.

In a failure detection mode that is based on metadata or a digital watermark associated with the primary content, computing device 110 may analyze metadata or a digital watermark associated with the primary content and compare it to expected metadata or an expected digital watermark that is expected to be associated with the primary content. For example, a valid primary content source may associate certain metadata with the primary content, such as by inserting metadata information into a file that contains the primary content. As another example, a valid primary content source may embed a digital watermark or other similar identifier into the signal that represents the primary content. If such metadata or watermark is missing, or is otherwise different from the metadata or watermark that is expected to be included in a valid signal from the primary content source, it may be assumed that the signal is coming from an invalid source, such as from a malicious content source. As such, if the metadata or the digital watermark associated with the first content is different from the expected metadata or watermark, computing device 110 may cause the backup content, rather than the primary content, to be displayed on display device 115.

In addition to causing the backup content to be displayed on display device 115, computing device 110 may also cause certain information to be stored for further processing when it is determined that the first content is not intended for display. For example, in the case of an unexpected display resolution, the computing device 110 may store the display resolution of the primary content, and may also store a portion of the primary content for further analysis. Similarly, in the case of an undesirable display mode, the computing device 110 may store information that indicates the undesirable display mode (e.g., a text mode), and may also store a portion of the primary content that would otherwise have been displayed on the display device 115.

In some cases, such information may allow a system administrator to debug the underlying issues that are causing the backup content to be displayed rather than the primary content. This capture of the error information may be useful in cases where, as may often be the case, one or more of the components will be rebooted either automatically or when attempting to resolve the failure. In such cases, the displayed error information, which may contain error codes or other useful information, may be lost when the component is rebooted. By storing the information, a system administrator may be able to ascertain what was happening in the system at the time of failure, and before the reboot.

As described above, the various failure detection modes may be used either alone or in combination. For example, in some implementations, if any of the failure detection modes indicates a failure or potential failure, the backup content may be displayed. In other implementations, one of the failure detection modes may be used as a preliminary indication of a failure or potential failure, and if such a preliminary indication occurs, then a secondary detection mode (or multiple detection modes) may be used to confirm the failure.

In some implementations, a standalone backup content device 125 may be connected directly to display device 115, and may include at least portions of the functionality described above with respect to computing device 110. Although standalone backup content device 125 is shown here implemented as a USB storage device, it may also be implemented as a flash storage device, or as another appropriate storage device capable of providing the functionality described here. Standalone backup content device 125 may store same, similar, or different backup content than backup content source 120. The backup content from standalone backup content device 125 is illustrated by the label B'.

Standalone backup content device 125 may include not only the backup content (B'), but may also include a standalone media player, a failure detection module, and/or other capabilities described in connection with computing device 110. In implementations where the standalone backup content device 125 is connected directly to display device 115, the backup device may perform the failure detection techniques as described above. For example, backup content device 125 may disable unintended primary content from being displayed on display device 115, and may instead cause display device 115 to display the backup content (B') stored on the standalone device.

Although an example system configuration is shown, it should be understood that different or additional components may also or alternatively perform portions or all of the functionality described above. For example, while the failure detection modules are described in connection with computing device 110 and/or standalone backup content device 125, such functionality may also or alternatively be performed by display device 115. As another example, display device 115 may include an embedded media player that may be used to play back either the primary content or the backup content, e.g., provided via a USB input. As another example, display device 115 may be configured to store the backup content internally such that, when the primary content is determined to not be intended for display, display device 115 may instead display the backup content stored on the device.

Figure 2:
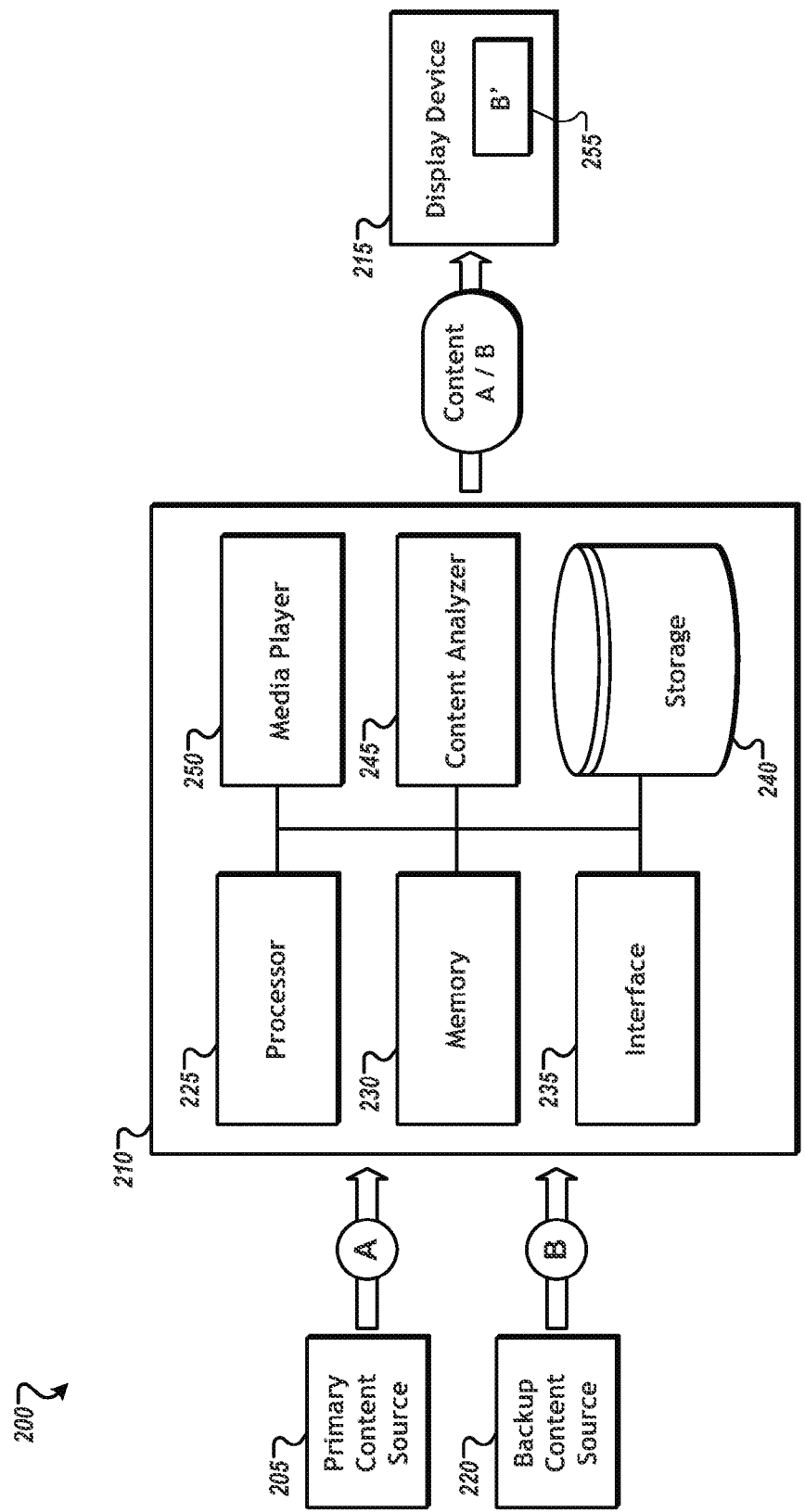
FIG. 2 shows a system diagram of example components of a digital signage system.

FIG. 2 shows a system diagram of example components of a digital signage system 200. In system 200, primary content source 205 provides primary content (labeled A) to a controller 210, and backup content source 220 provides backup content (labeled B) to the controller 210. In turn, controller 210 causes either the primary content (A) or the backup content (B) to be presented on display device 215.

Controller 210 may include a number of components to determine which of the primary content (A) or the backup content (B) should be displayed, and to cause playback of the appropriate content on display device 215. For example, controller 210 may include a processor 225, a memory 230, an interface 235, a storage device 240, a content analyzer module 245, and a media player module 250. Controller 210 may also include multiple ones of the components mentioned above.

Processor 225 may be configured to process instructions for execution by the controller 210. The instructions may be stored on a tangible computer-readable storage medium, such as in memory 230, or on a separate storage device 240, or on any other type of volatile or non-volatile memory that stores instructions to cause a programmable processor to perform the techniques described herein. Alternatively or additionally, controller 210 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

Interface 235 may be implemented in hardware and/or software, and may be configured, for example, to receive content from multiple content sources, and to issue appropriate signals or commands to display device 215.

Content analyzer module 245 may be configured to analyze information indicative of content represented by an input signal, and to determine whether the input signal is intended for playback on display device 215. The output of such analysis may be used by controller 210 to determine which of the primary content (A) or the backup content (B) should be displayed, and to cause playback of the appropriate content, e.g., by media player 250, on display device 215.

For example, content analyzer module 245 may compare a display resolution associated with the primary content (A) to an expected display resolution, and determine that the primary content is not intended for playback if the display resolution does not match the expected display resolution. As another example, content analyzer module 245 may compare a display mode associated with the primary content (A) to known unintended display modes (e.g., a text mode), and determine that the primary content is not intended for playback if the display mode matches one of the known unintended display modes.

As another example, content analyzer module 245 may monitor a heartbeat signal that is associated with a playback mechanism for playback of the primary content (A). For example, an application executing on primary content source 205 or on controller 210 may issue period heartbeat signals that indicate proper functioning of the application. If content analyzer module 245 does not receive the heartbeat signal in an expected amount of time, it may determine that there is a malfunction somewhere in the playback chain associated with the primary content, and may therefore determine that the primary content is not intended for playback on the display device 215.

As another example, content analyzer module 245 may compare metadata associated with the primary content (A) to metadata that is expected to be associated with the primary content. In such cases, if the metadata associated with the primary content is different from the expected metadata, content analyzer module 245 may determine that the primary content is not intended for playback on the display device 215.

If content analyzer module 245 determines, e.g., using any of the analysis techniques described above, that the primary content (A) is not intended for playback on the display device 215, the controller 210 may cause media player 250 to playback the backup content (B) on display device 215. Otherwise, if no exceptions are detected, the controller 210 may cause media player 250 to playback the primary content (A).

It should be understood that the components described above are for illustrative purposes only, and that different or additional components may be included in system 200 to perform the functionality as described. In some implementations, certain portions or all of the components and/or functionality may be integrated with display device 215 to provide an intelligent display device. For example, display device 215 may include certain integrated components 255, such as some or all of the components described in connection with controller 210. Integrated components 255 may also include storage for storing backup content (labeled B') directly on the display device 215, which may be played in the event that content from the primary content source 205 is not intended for display.

In other implementations, backup content source 220 may be integrated into a standalone controller, which may be implemented, for example, as a USB storage device that may be connected directly to display device 215 via a USB port. In such implementations, the standalone controller may also include certain of the components described in connection with controller 210.

Figure 3:
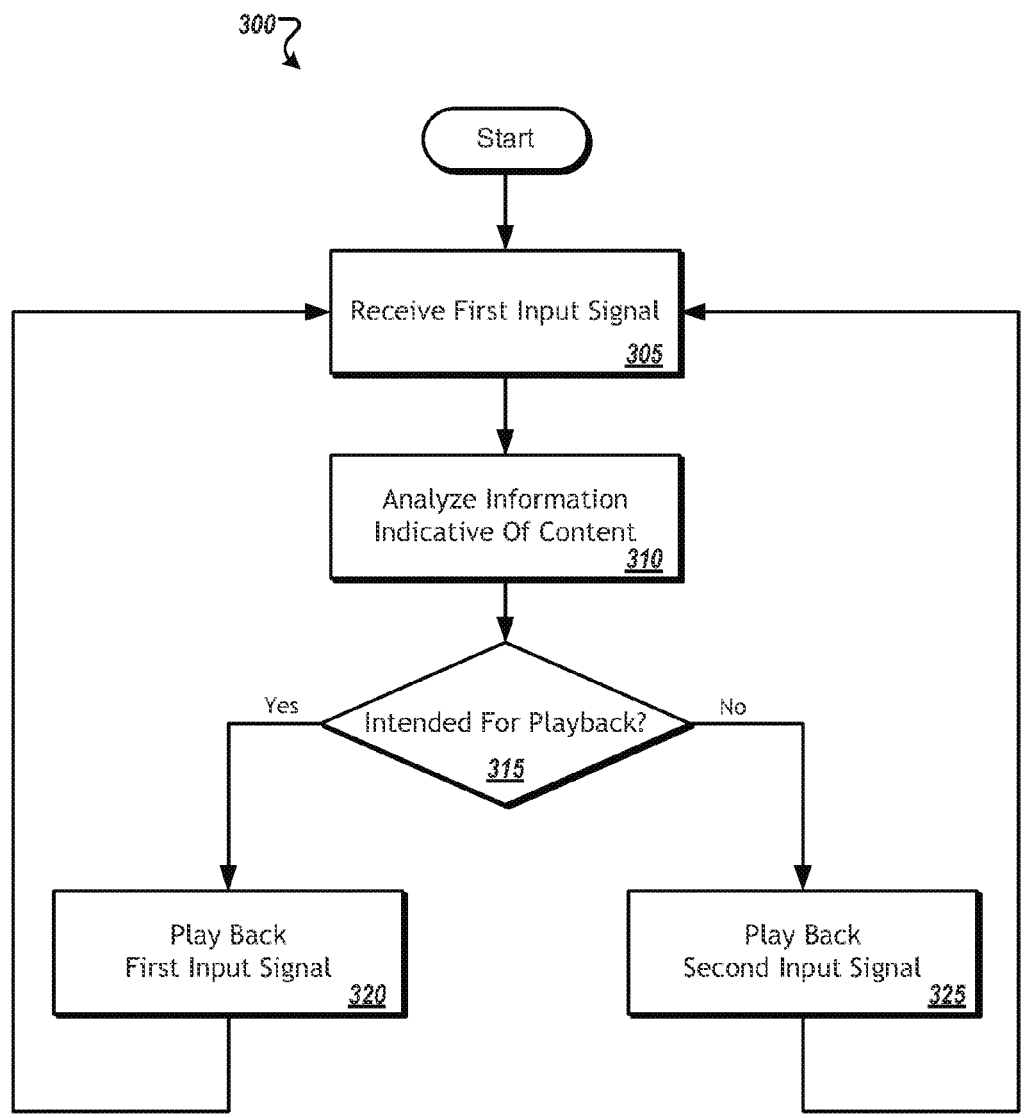
FIG. 3 shows a flow diagram of an example process for selecting an input signal for playback on a digital signage display device.

FIG. 3 shows a flow diagram of an example process 300 for selecting an input signal for playback on a digital signage display device. The process 300 may be performed, for example, by one or more components of a digital signage system, such as the digital signage system illustrated in FIG. 1. For clarity of presentation, the description that follows uses the digital signage system of FIG. 1 as the basis of an example for describing the process. However, another system, or combination of systems, may be used to perform the process or various portions of the process.

Process 300 begins at block 305, in which a first input signal is received at a computing device, such as computing device 110. The first input signal is provided by a first electronic content source, such as primary content source 105. The first input signal is used for playback by a presentation device, such as display device 115.

At block 310, the computing device analyzes information that is indicative of content represented by the first input signal. The information may include, for example, a display resolution associated with the first input signal, or a display mode associated with the first input signal, or a heartbeat signal that is associated with a playback mechanism for playback of the first input signal, or metadata associated with the first input signal.

At decision block 315, the computing device determines whether the first input signal is intended for playback by the presentation device based on the analyzed information. Some examples of how such a determination is made are described below.

In the case of display resolution information, the computing device may compare the display resolution associated with the first input signal to an expected display resolution. If the display resolution associated with the first input signal is different from the expected display resolution, then the computing device may determine that the first input signal is not intended for playback by the presentation device.

In the case of display mode information, the computing device may compare the display mode associated with the first input signal to a known undesirable display mode. If the display mode associated with the first input signal matches the known undesirable display mode, then the computing device may determine that the first input signal is not intended for playback by the presentation device.

In the case of heartbeat signal information, the computing device may monitor a heartbeat signal associated with a playback mechanism for playback of the first input signal. If the heartbeat signal has not been received for a period of time that is longer than expected, then the computing device may determine that the first input signal is not intended for playback by the presentation device.

In the case of metadata information, the computing device may compare metadata associated with the first input signal to expected metadata. If the metadata associated with the first input signal is different from the expected metadata, then the computing device may determine that the first input signal is not intended for playback by the presentation device.

If the computing device determines that the first input signal is intended for playback by the presentation device, e.g., if none of the above-mentioned techniques indicates that the first input signal is not intended for playback by the presentation device, then the computing device may cause the presentation device to play back the first input signal at block 320. For example, the computing device may send an appropriate control signal to the presentation device to play back the signal provided at a first input to the display.

If the computing device determines that the first input signal is not intended for playback by the presentation device, e.g., using any of the above-mentioned techniques, then the computing device may cause the presentation device to play back a second input signal at block 325. For example, the computing device may send an appropriate control signal to the presentation device to play back the signal provided at a second input to the display.

Process 300 may continue while either the first or the second input signal is being displayed, and the computing device may subsequently cause the display to present the other input signal as conditions change. For example, if the computing device has caused the presentation device to play back the second input signal at block 325, but the computing device subsequently determines that the first input signal is intended for playback by the presentation device (e.g., if the previous failures have been corrected), the computing device may cause the presentation device to switch back to playing the first input signal.

Although a few implementations have been described in detail above, other modifications are possible. For example, the logic flows depicted in the figures may not require the particular order shown, or sequential order, to achieve desirable results. In addition, other steps may be provided, or steps may be eliminated, from the described flows. Similarly, other components may be added to, or removed from, the described systems. Accordingly, other implementations are within the scope of the following claims.

What is claimed is:

1. A method for selecting content for playback, the method comprising:
  receiving, at a computing device and from a primary electronic content source, a first input signal for playback by a presentation device;
  analyzing, using the computing device, information that is indicative of content represented by the first input signal to determine whether the first input signal is intended for playback by the presentation device
    wherein analyzing information that is indicative of content represented by the first input signal comprises comparing metadata located in a file along with the first input signal to expected metadata, and determining that the first input signal is not intended for playback by the presentation device if the metadata associated with the first input signal is different from the expected metadata; and
  in response to determining that the first input signal is not intended for playback by the presentation device due to unexpected metadata being associated with the first input signal, causing, by the computing device, the presentation device to play back a second input signal from a backup electronic content source that is different from the primary electronic content source.

2. The method of claim 1, wherein analyzing information that is indicative of represented by the first input signal comprises comparing a display resolution associated with the first input signal to an expected display resolution, and determining that the first input signal is not intended for playback by the presentation device if the display resolution is different from the expected display resolution.

3. The method of claim 1, wherein analyzing information that is indicative of content represented by the first input signal comprises comparing a portion of an image represented by the first input signal to a portion of a known unintended image, and determining that the first input signal is not intended for playback by the presentation device if the portion of the image matches the portion of the known unintended image.

4. The method of claim 1, wherein analyzing information that is indicative of content represented by the first input signal comprises monitoring a heartbeat signal associated with a playback mechanism for playback of the first input signal, and determining that the first input signal is not intended for playback by the presentation device if the heartbeat signal has not been received for a period of time that is longer than expected.

5. The method of claim 1, further comprising, analyzing, while the presentation device is playing back the second input signal, subsequent information that is indicative of content represented by the first input signal to determine, based on the analyzed subsequent information, whether the first input signal is intended for playback by the presentation device, and in response to determining that the first input signal is intended for playback by the presentation device, causing the presentation device to play back the first input signal.

6. The method of claim 1, further comprising, in response to determining that the first input signal is not intended for playback by the presentation device, storing the analyzed information and at least a portion of the first input, signal for further processing.

7. A system comprising;
  a display device to present content received from one of a plurality of sources;
  a first content source to provide first content for presentation by the display device:
  a second content source to provide second content for presentation by the display device, wherein the second content source is different from the first content source; and
  a controller that causes the first content to be presented by the display device if the first content is intended for presentation by the display device, and causes the second content to be presented by the display device if the first content is not intended for presentation by the display device due to unexpected metadata being associated with the first content
    wherein the controller, in response to determining that the first content is not intended for display, causes information associated with the first content to be stored.

8. The system of claim 7, wherein the controller compares a display resolution of the first content to an expected display resolution, and determines that the first content is not intended for presentation by the display device if the display resolution does not match the expected display resolution.

9. The system of claim 7, wherein the controller compares a display mode of the first content to a known undesirable display mode, and determines that the first content is not intended for presentation by the display device if the display mode matches the known undesirable display mode.

10. The system of claim 7, wherein the controller monitors a heartbeat signal associated with a playback mechanism for presenting the first content, and determines that the first content is not intended for presentation by the display device if the heartbeat signal has not been received for a period of time that is longer than expected.

11. The system of claim 7, wherein the controller compares a digital watermark associated with the first content to an expected digital watermark, and determines that the first content is not intended for presentation by the display device if the digital watermark associated with the first content does not match the expected digital watermark.

12. The system of claim 7, wherein the controller causes the first content to be presented by the display device in response to determining, at a time when the display device is presenting the second content, that the first content is intended for presentation by the display device.

13. The system of claim 7, wherein the second content source is a standalone backup content device connected directly to the display device.

14. The system of claim 7, wherein the second content source is embedded in the display device.

15. A non-transitory computer-readable storage medium storing instructions that, when executed by a processor, cause the processor to:
  receive, at a computing device, first content from a first content source for display on a digital signage device;
  detect, at the computing device, a failure condition present in the first content or the first content source, wherein the failure condition comprises unexpected metadata associated with the first content and causes unintended content to be displayed on the digital signage device;
  in response to detecting the failure condition, cause, at the computing device, information associated with the first content to be stored; and
  in response to detecting the failure condition, cause, from the computing device, the digital signage device to display second content from a second content source that is different from the first content source.

16. The non-transitory computer-readable storage medium of claim 15, wherein the failure condition comprises an unexpected display resolution of the first content.

17. The non-transitory computer-readable storage medium of claim 15, wherein the failure condition comprises an unexpected display mode of the first content.

\* \* \* \* \*